May 29, 1934.  A. W. PHELPS ET AL  1,960,954
MACHINE FOR FASTENING A WIRE TO A TUBE
Filed Nov. 21, 1931  13 Sheets-Sheet 1

Inventors
Alva W. Phelps
John A. Holmes
Charles E. Birch
Homer E. Smith
By Spencer Hardman & Fehr
their Attorneys

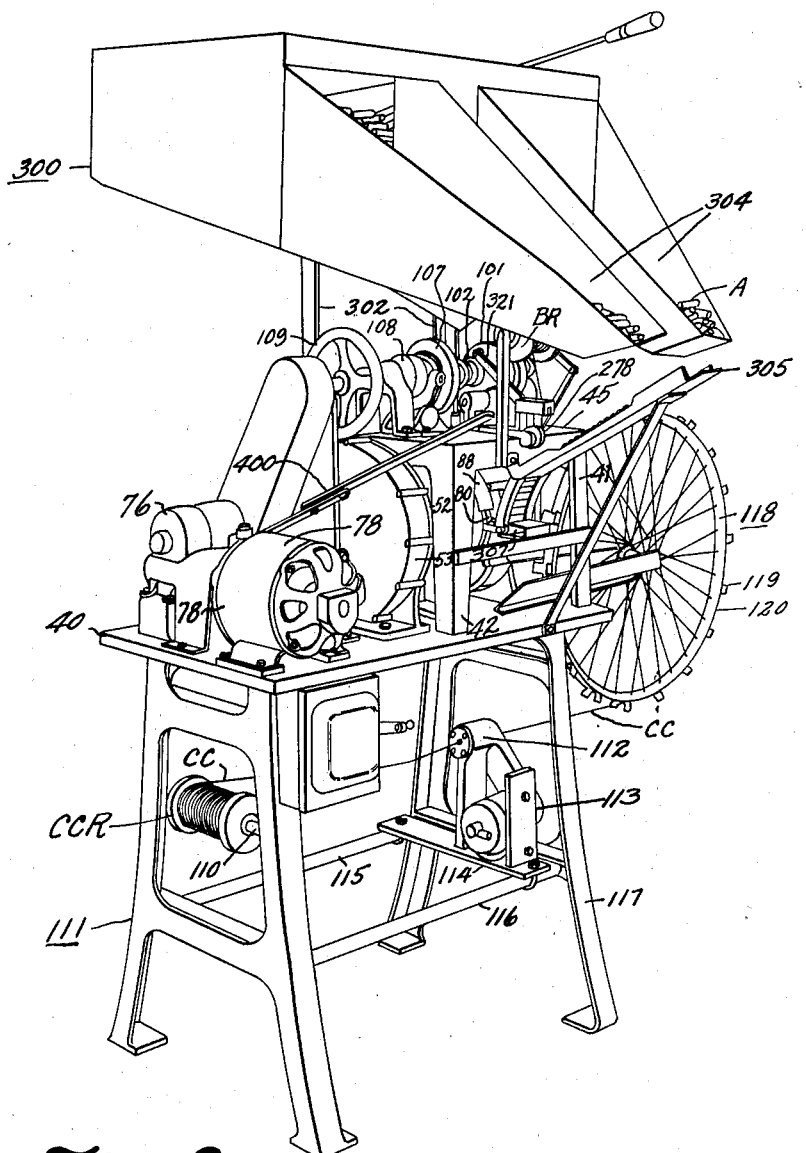

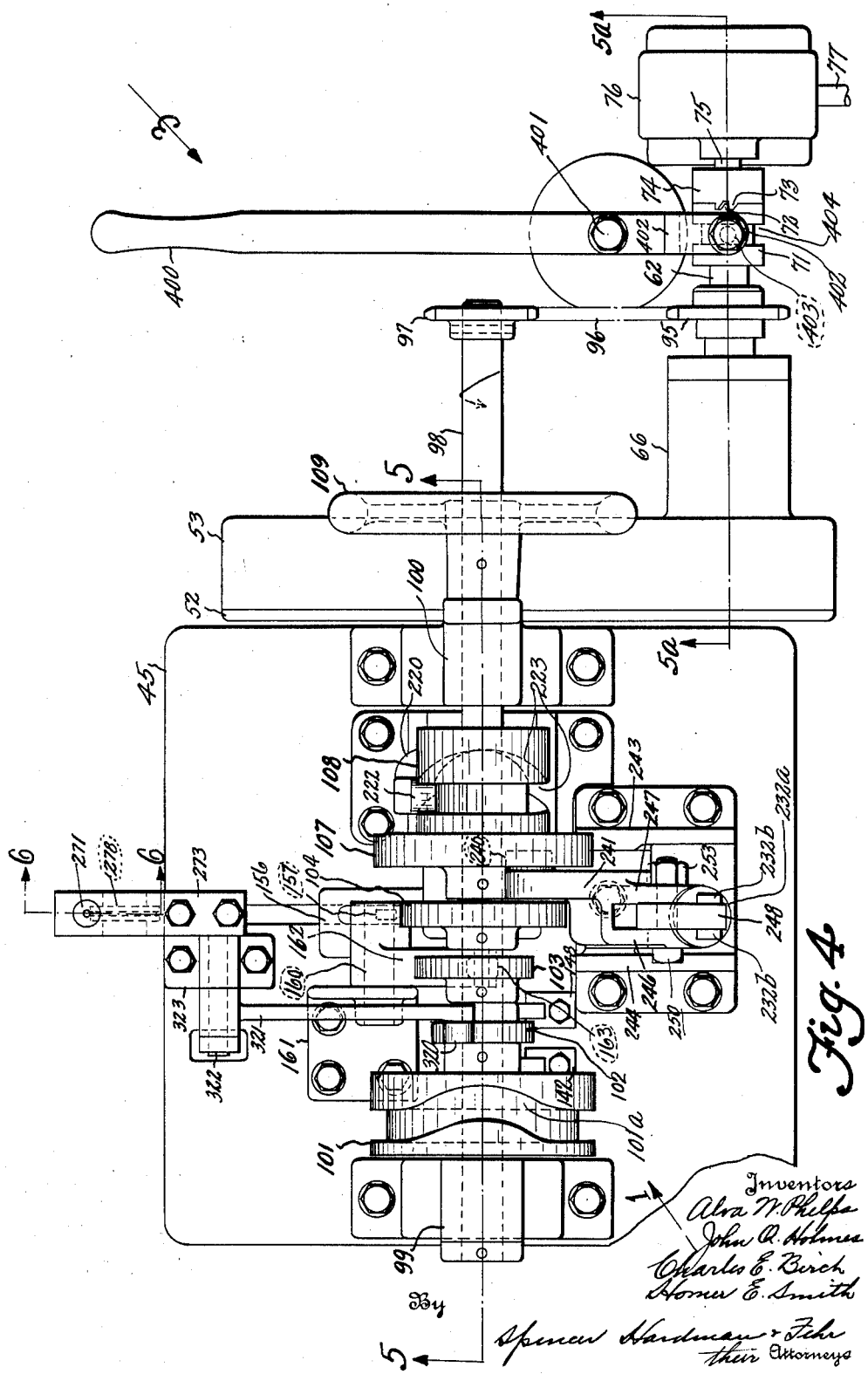

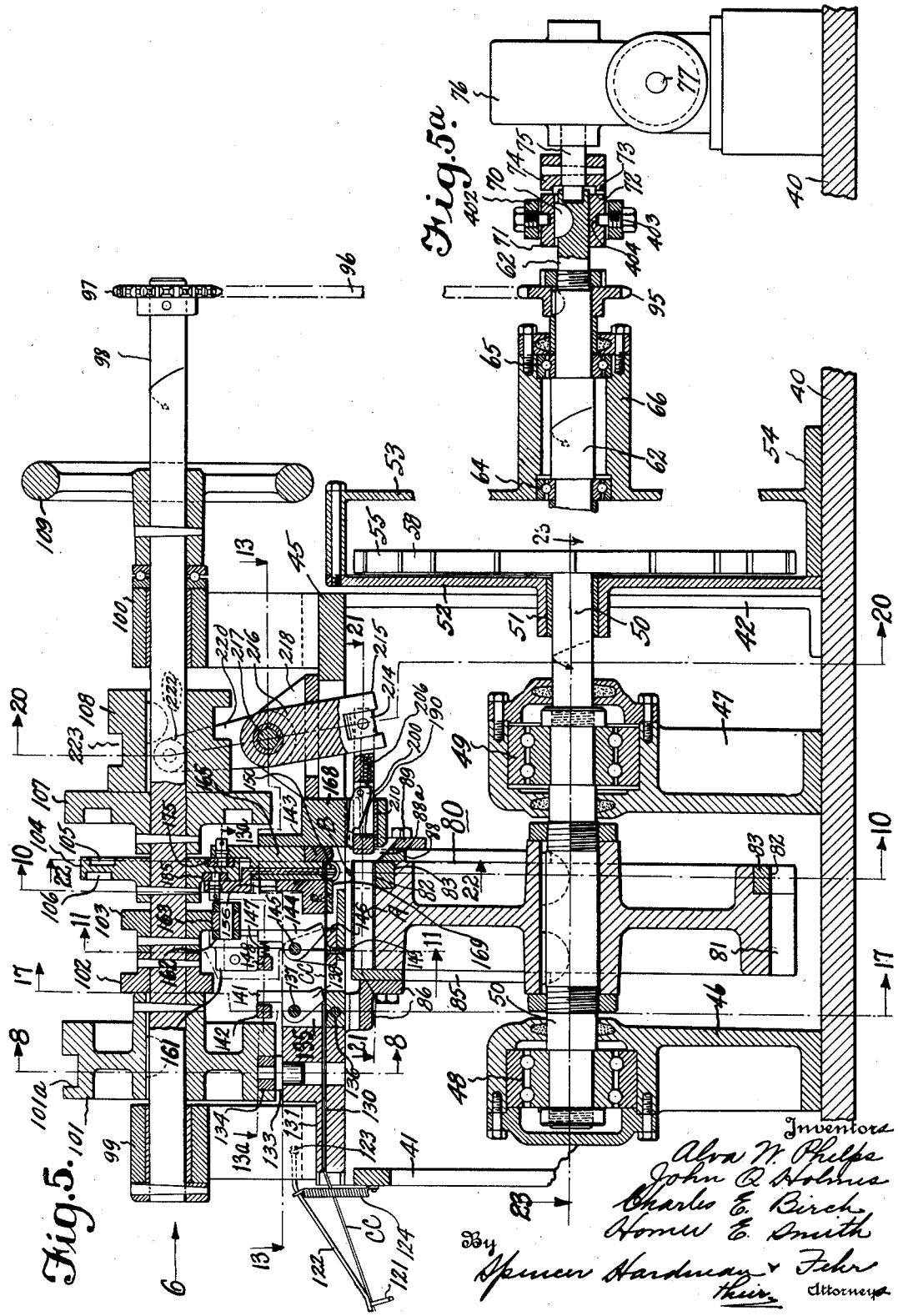

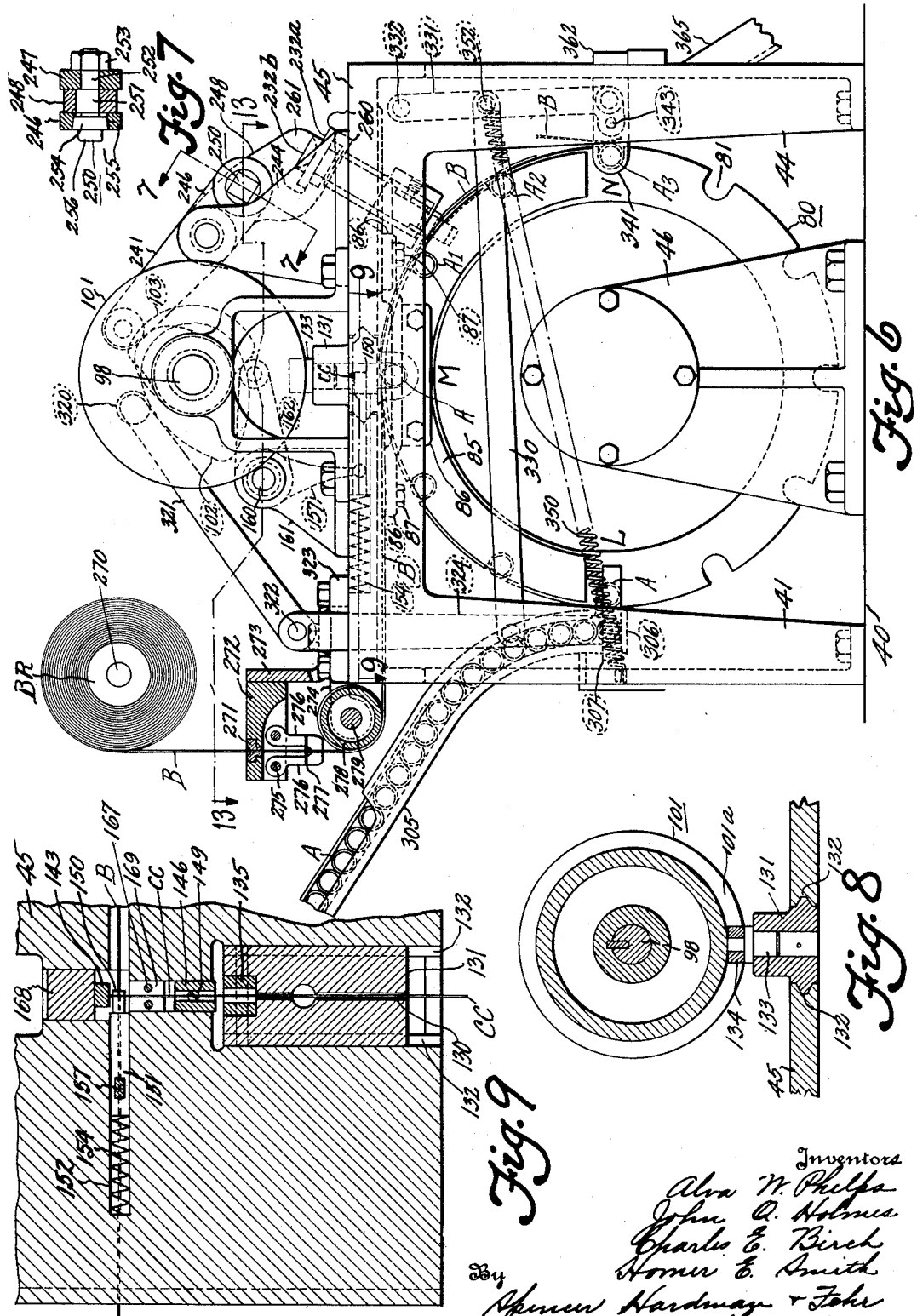

May 29, 1934.　　A. W. PHELPS ET AL　　1,960,954
MACHINE FOR FASTENING A WIRE TO A TUBE
Filed Nov. 21, 1931　　13 Sheets-Sheet 6
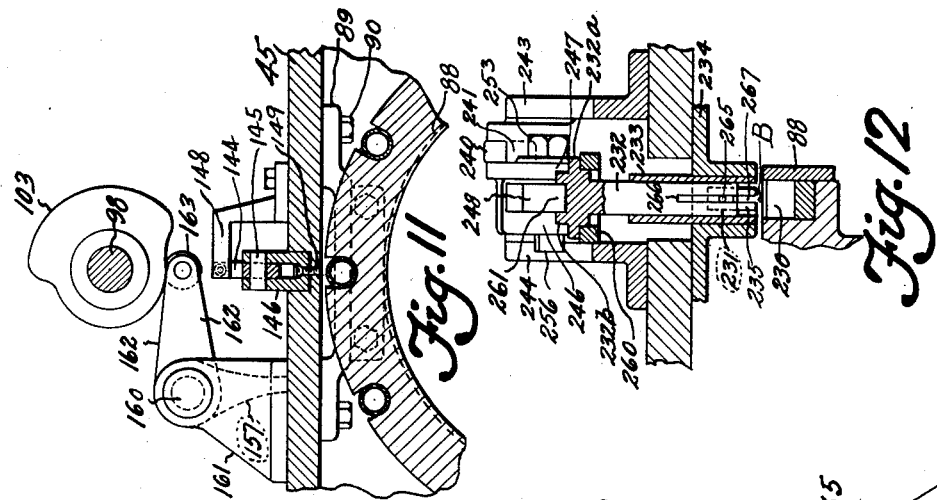
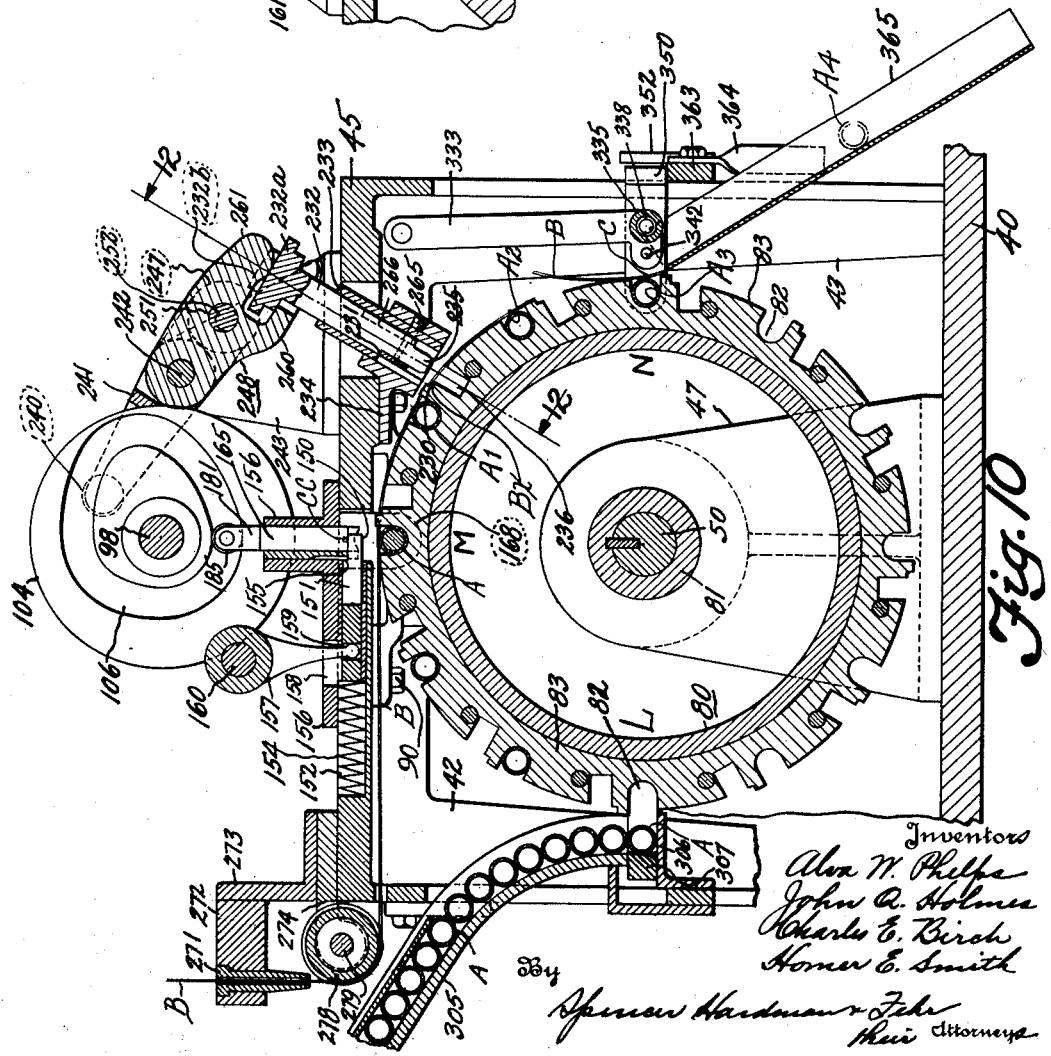

May 29, 1934.   A. W. PHELPS ET AL   1,960,954
MACHINE FOR FASTENING A WIRE TO A TUBE
Filed Nov. 21, 1931   13 Sheets-Sheet 7
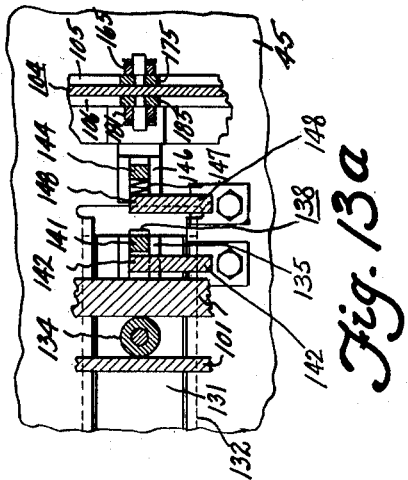
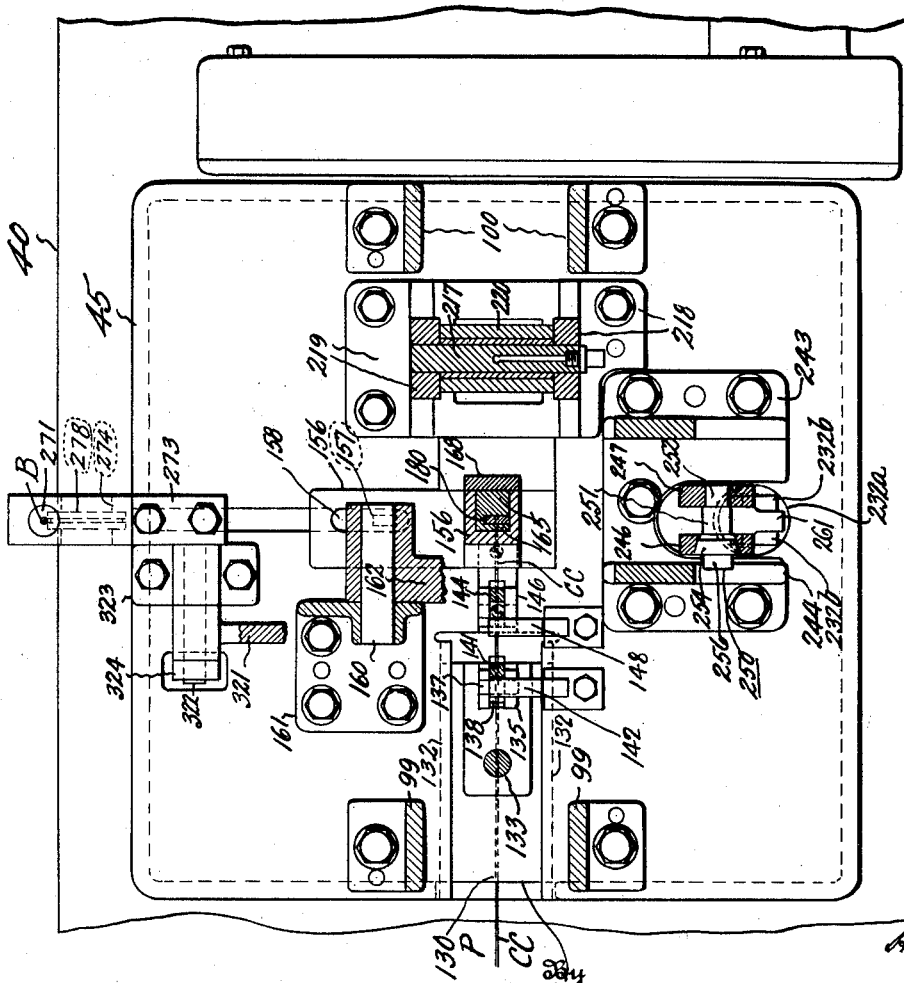

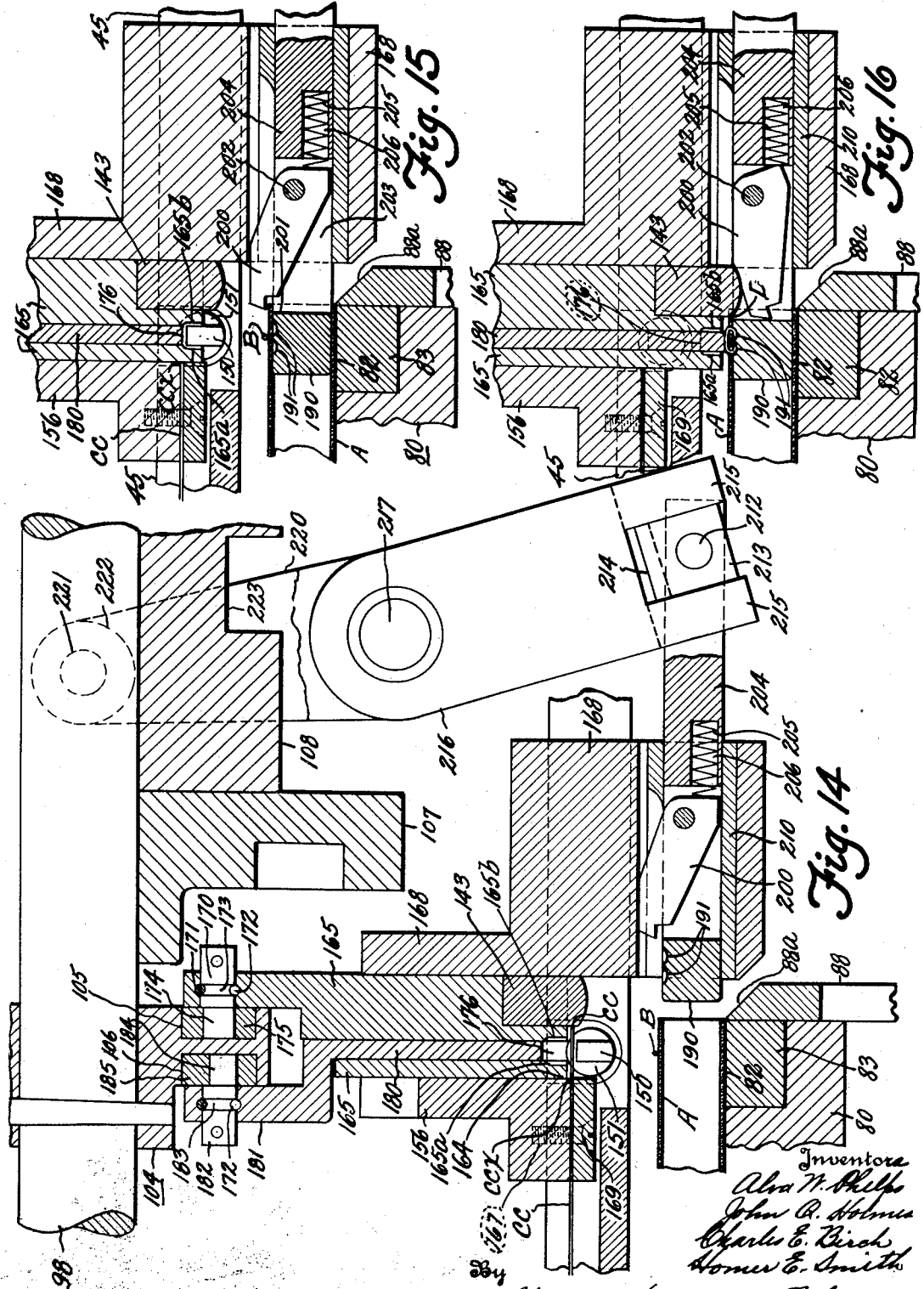

May 29, 1934.  A. W. PHELPS ET AL  1,960,954
MACHINE FOR FASTENING A WIRE TO A TUBE
Filed Nov. 21, 1931  13 Sheets-Sheet 9

May 29, 1934.  A. W. PHELPS ET AL  1,960,954
MACHINE FOR FASTENING A WIRE TO A TUBE
Filed Nov. 21, 1931   13 Sheets-Sheet 10
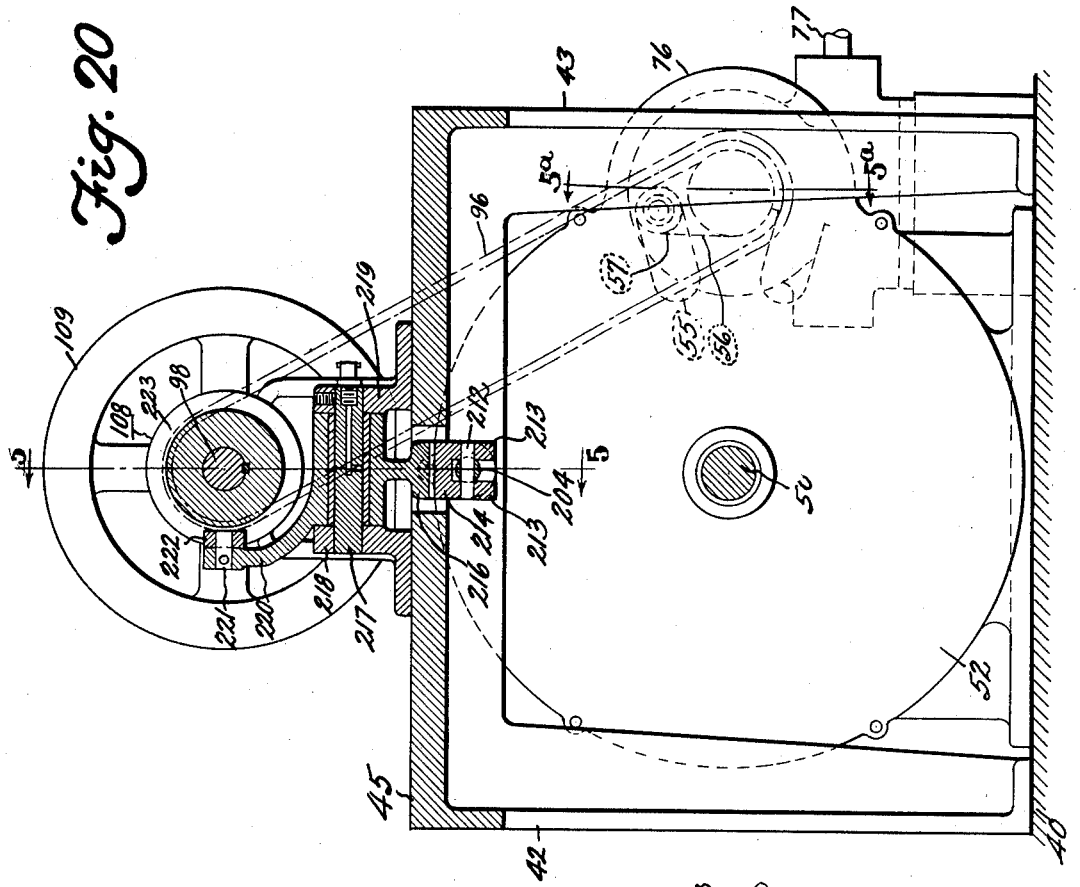
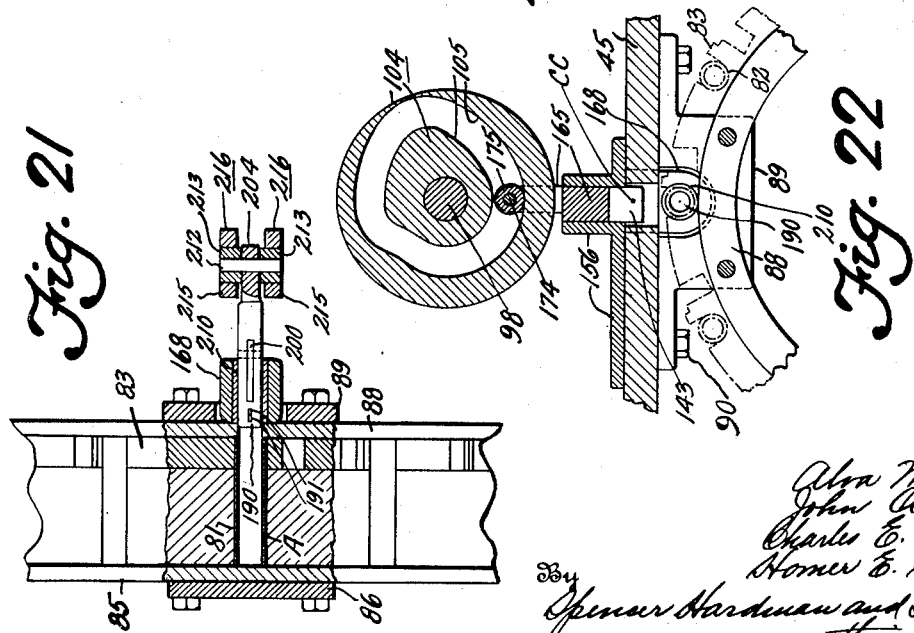

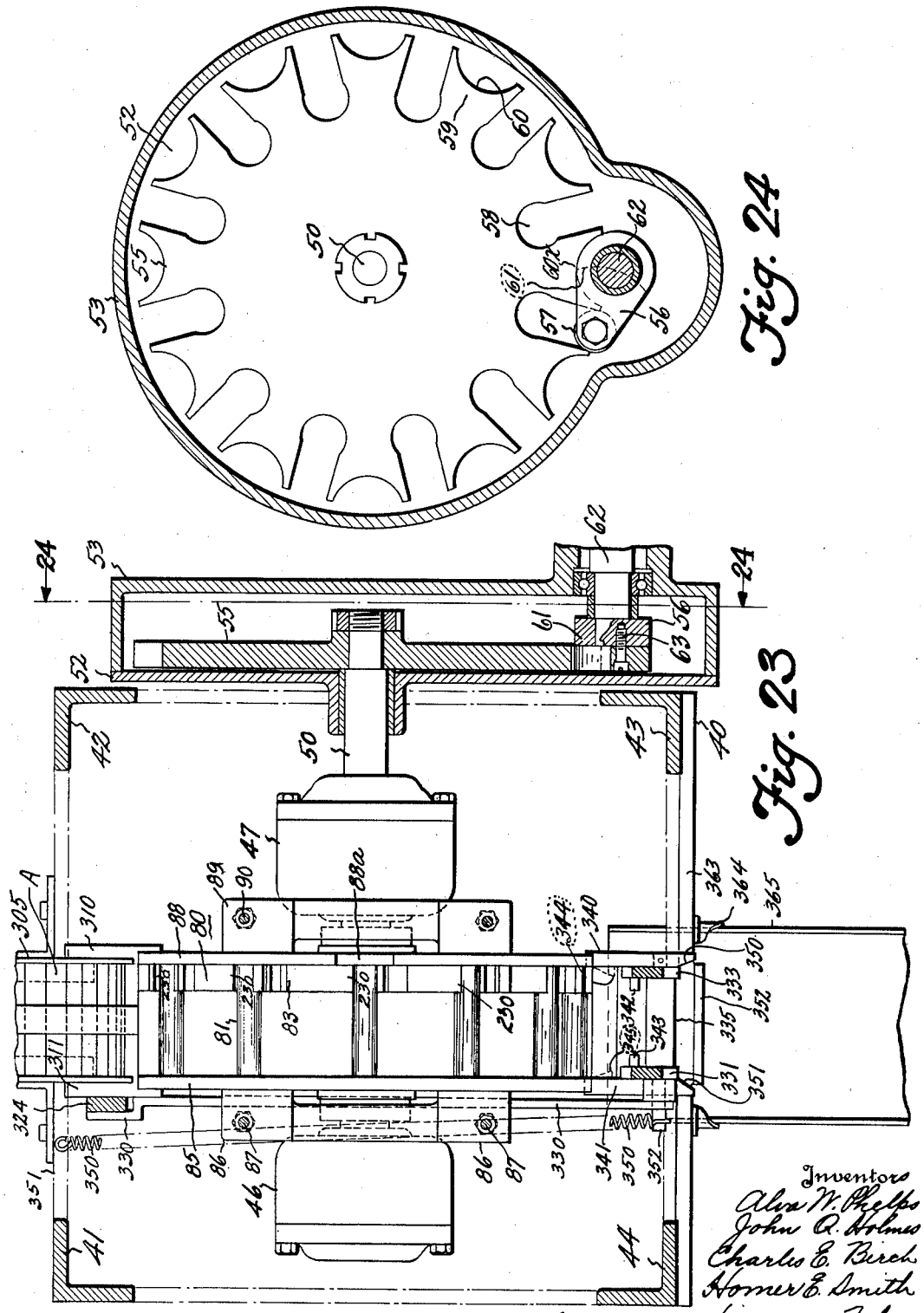

May 29, 1934.  A. W. PHELPS ET AL  1,960,954
MACHINE FOR FASTENING A WIRE TO A TUBE
Filed Nov. 21, 1931    13 Sheets-Sheet 13
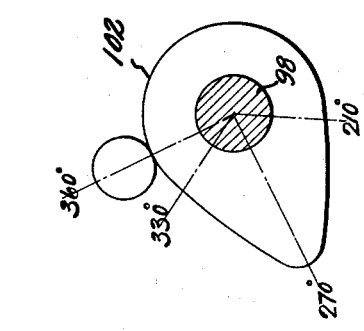
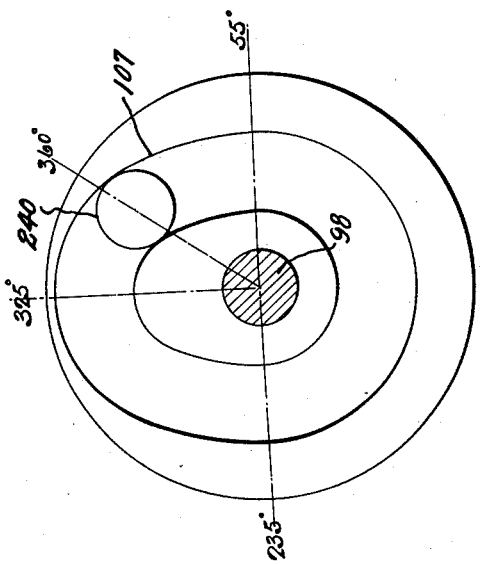
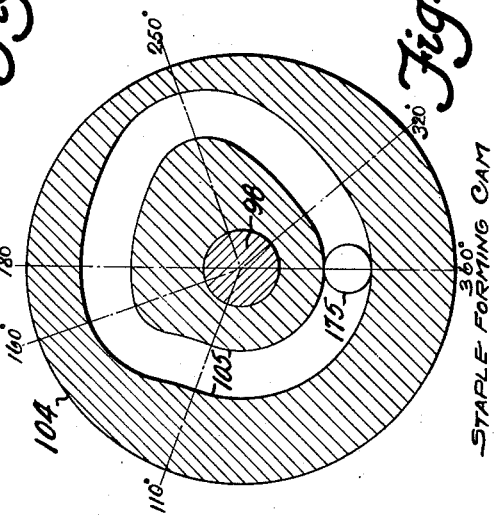
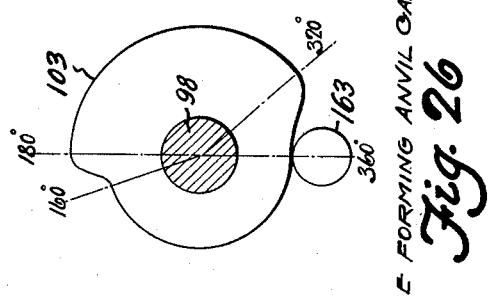

Patented May 29, 1934

1,960,954

UNITED STATES PATENT OFFICE 1,960,954

MACHINE FOR FASTENING A WIRE TO A TUBE

Alva W. Phelps, John Q. Holmes, Charles E. Birch, and Homer E. Smith, Anderson, Ind., assignors, by mesne assignments, to General Motors Corporation, Detroit, Mich., a corporation of Delaware Application November 21, 1931, Serial No. 576,508

70 Claims. (Cl. 1—2)

This invention relates to a machine for attaching wires to other parts preferably by stapling.

It is an object of the present invention to provide a machine for fastening a conductor wire to a work piece such as a nonconducting tube upon which a coil of wire may be wound for use in electrical apparatus. The machine fastens to the tube a conductor at a point intermediate the ends of the conductor so that one end of the conductor may provide a conducting lead for the coil to be wound upon the tube and the other end of the conductor may be connected, prior to winding, to the start end of the wire which is wound upon the tube to form the coil.

The machine embodying the present invention comprises a conveyor having a plurality of work holders each for receiving a part such as a nonconducting tube. The conveyor is intermittently moved to move the work holders successively past a station where a wire leading from a supply reel of conducting wire is attached to a tube preferably by stapling. After stapling the wire the wire is severed at a point between that tube and the tube ahead in the direction of movement of the conveyor to which the wire had been fastened by preceding operation. Means are provided for automatically feeding work pieces such as tubes into the conveyor and for automatically removing the tubes after lengths of wire have been attached thereto. The machine provides means for making wire staples automatically and for using these staples as they are made to fasten the conductor wire to the tubes. The machine also cuts a notch near one end of each tube, said notch receiving a portion of the conductor wire which may be passed around one end of the tube and then inserted within the tube.

Further objects and advantages of the present invention will be apparent from the following description, reference being had to the accompanying drawings wherein a preferred embodiment of one form of the present invention is clearly shown.

In the drawings:

Fig. 3 is a perspective view of the machine looking in the direction of the arrow 3 of Fig. 4.

Fig. 4 is a plan view of the machine the hoppers and chutes being removed.

Fig. 5 is a longitudinal sectional view taken on the line 5—5 of Fig. 4.

Fig. 5a is a longitudinal sectional view taken on the line 5a—5a of Fig. 4.

Fig. 6 is an end view taken in the direction of arrow 6 of Fig. 5 and is partly in section, the section being taken on the line 6—6 of Fig. 4.

Fig. 7 is a fragmentary sectional view on line 7—7 of Fig. 6.

Fig. 8 is a sectional view taken on the line 8—8 of Fig. 5.

Fig. 9 is a view taken on the line 9—9 of Fig. 6.

Fig. 10 is a transverse sectional view taken on the line 10—10 of Fig. 5.

Fig. 11 is a view taken on the line 11—11 of Fig. 5.

Fig. 12 is a view taken on the line 12—12 of Fig. 10.

Fig. 13 is a view taken on the line 13—13 of Figs. 5 and 6.

Fig. 13a is a view taken on the line 13a—13a of Fig. 5.

Figs. 14, 15 and 16 are fragmentary views on an enlarged scale showing the operation of forming a staple and applying the staple to a tube for fastening to the tube a conductor wire. These views are taken on the same sectional plane as Fig. 5.

Fig. 20 is a sectional view taken on the line 20—20 of Fig. 5.

Fig. 21 is a fragmentary view taken on the line 21—21 of Fig. 5.

Fig. 22 is a fragmentary view taken on the line 22—22 of Fig. 5.

Fig. 23 is a plan view of the conveyor, its support and driving mechanism, certain parts being shown in section taken on the line 23—23 of Fig. 5.

Fig. 24 is a sectional view taken on the line 24—24 of Fig. 23.

Fig. 26 is a diagram of the staple forming anvil cam.

Fig. 27 is a diagram of the conductor wire cutting cam.

Fig. 28 is a diagram of the tube feeder and ejector cam.

Fig. 29 is a diagram of the stapling forming cam.

Fig. 30 is a diagram of the riveting punch cam which forces the staple into the tube.

Figure 1:
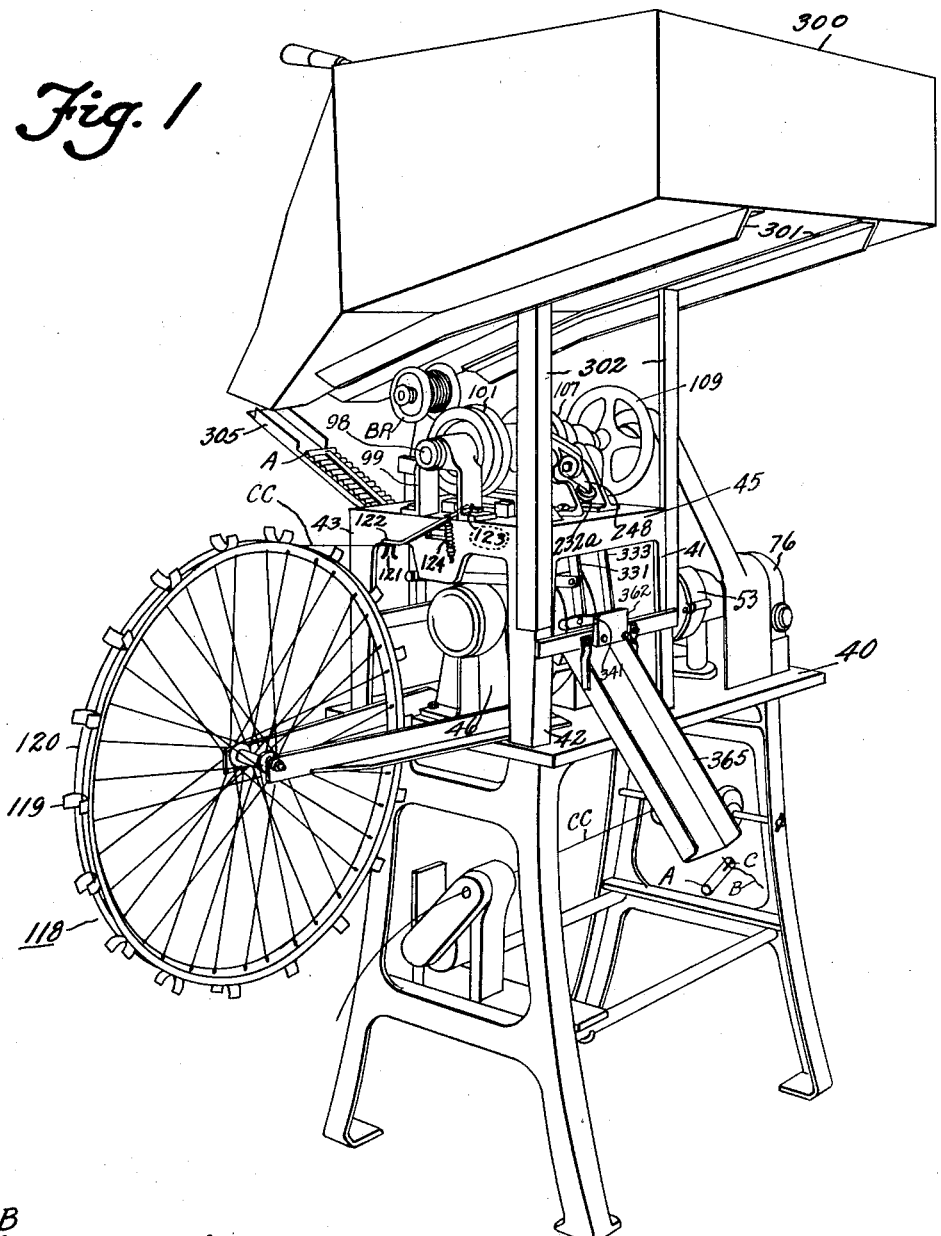
Fig. 1 is a perspective view of a machine embodying the present invention looking in the direction of the arrow 1 of Fig. 4.

Referring principally to Figs. 5, 23 and 24, the machine comprises a base 40, which supports a frame comprising legs 41, 42, 43 and 44, which support a table 45. Below the table 45 there are two brackets 46 and 47 supporting anti-friction bearings 48 and 49 respectively for a shaft 50 received also by bearing 51 in the cover 52 of a gear case 53 having a base 54 attached to the base 40. The case 53 encloses a Geneva driven gear 55 attached to the shaft 50 and operated by a Geneva driving gear which comprises an arm 56 carrying a roller 57 which is received by the notches 58 of the gear 55. Teeth 59 of the gear 55 are each provided with a notch defined by an arcuate surface 60 which, when located adjacent into position 60X in Fig. 23, will receive a Geneva gear locking member 61. The lever 56 is fastened to a shaft 62 to which a screw 63 secures the locking member 61. The shaft 62 is journaled in anti-friction bearings 64 and 65 carried by the tubular extension 66 of the case 53. The shaft 62 carries a key 70 to provide a sliding driving engagement with an axially slidable clutch member 71 having teeth 72, shown in Fig. 4, adapted to be engaged by teeth 73 of a clutch member 74 pinned to a shaft 75 which is connected through the speed reducing gear contained in a gear case 76 with a drive shaft 77 which may be driven in any suitable manner as by an electric motor 78, shown in Fig. 3.

Figure 2:
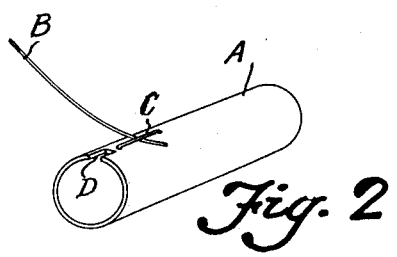
Fig. 2 is a perspective view of a tube to which a wire has been stapled by the machine shown in Fig. 1.

Since the Geneva driven gear 55 has 12 notches 58, the shaft 50 will be turned $\frac{1}{12}$ of a revolution or 30 degrees during each revolution of the shaft 62. Accordingly, the rotatable conveyor 80 which is intermittently turned or indexed by the shaft 50 is provided with 12 equidistant work holder recesses 81, each adapted to receive a tube A to which, as shown in Fig. 2, a wire B is attached by staples C. A part of each recess is defined by a notch 82 in a hardened metal plate 83 attached to the conveyor wheel 80.

Referring to Fig. 10, it will be noted that tubes A are placed in the conveyor 80 at station L and are removed at station N. As the work holder recesses move from station N to station L during the course of several indexing operations they are empty. While these recesses move from station L to station N their lefthand ends, as viewed in Fig. 5 are closed by an arcuate plate 85 attached to a bracket 86 attached by screws 87 to the underside of table 45. The right hand ends of tubes A, as viewed in Fig. 5, are closed by an arcuate plate 88 secured to a bracket 89 attached by screws 90 to the underside of table 45. Referring to Figs. 5, 14 to 16, it will be seen that the plate 88 is cut away at 88a to provide clearance for the riveting anvil to be described.

The shaft 62 carries a sprocket 95 connected by a chain 96 with a sprocket 97 attached to a cam shaft 98 journaled in bearings provided by brackets 99 and 100 attached to the table 45. Reading from left to right in Fig. 5, the shaft 98 carries a stapling wire feeding cam 101, a tube feed and an ejector cam 102, indicated in Fig. 28, a staple-forming anvil operating cam 103, shown in Fig. 26, a cam disc 104 having a race 105 providing the staple-forming cam shown in Fig. 29, and having a race 106 providing the staple riveting punch cam shown in Fig. 30, a conductor wire-cutting cam 107 shown in Fig. 27, and a rivet anvil-operating cam 108, and a handwheel 109.

*Staple wire feeding mechanism*

The wire CC for forming the staple C. shown in Fig. 3 is fed from a supply reel CCR mounted on a horizontal spindle 110 carried by frame 111 which supports the base 40. The wire CC is fed through a wire straightening mechanism 112 driven by a small electric motor 113 mounted on a base 114 carried by cross-bars 115 and 116 which connect the frame 111 with the frame 117 which also supports the base 40. The stapling wire CC is wound by hand upon a reel 118 formed by attaching U-shaped clips 119 to the rim of an ordinary bicycle wheel 120. After a supply of wire CC has been wound upon the reel this wire is unwound from the reel as needed for the making of wire staples. The stapling wire CC passes between the prongs of a clip 121 shown in Fig. 1 attached to a rod 122 extending from bracket 99 and pivoted thereto at 123. The rod 122 is urged downwardly by a spring 124 which tends to maintain the wire CC taut between the wheel and the wire feeding mechanism which will now be described.

Referring to Fig. 9, the wire CC passes through a longitudinal passage 130 in a horizontally slidable block 131 which is guided by ways or grooves 132 provided by the table 45. Referring to Figs. 5 and 8, the block 131 carries a stud 133 which carries a roller 134 received by the race 101a in the cam 101. The block 131 is notched to receive a wear piece 135 secured by pins 136 and 137. The pin 137 provides a pivotal support for a gripping dog 138 received by a notch 139 provided by the wear piece 135. The dog 138 has a serrated lower end for gripping the wire CC while forcing the wear piece against 135. The dog 138 has an arm 141 engageable with a stationary bar 142 when the slide 131 is moved into its extreme left position. When the arm 141 strikes the bar 142 the surface of the dog 138 is forced into the wire CC thereby causing the same to be firmly gripped against the wear piece 135. In this way the wire CC is gripped to the slide 131 so that when the slide 131 is moved by the cam 101 toward the right hand end the wire CC will be moved against a stop 143. When the slide 131 is retracted, or moved toward the left, prior to feeding the wire by movement to the right, the wire CC is prevented from moving toward the left by a gripping dog 144 pivoted upon a pin 145 carried by bracket 146 and urged into engagement with wire CC by a spring 147 the left hand end of which bears against a stationary block 148. In this way the spring 147 urges the dog 144 against the wire CC and the wire CC against the bracket 146 located in a groove in table 45 and attached thereto by a screw 149 as shown in Fig. 11.

*Mechanism for forming a wire staple*

Figure 25:
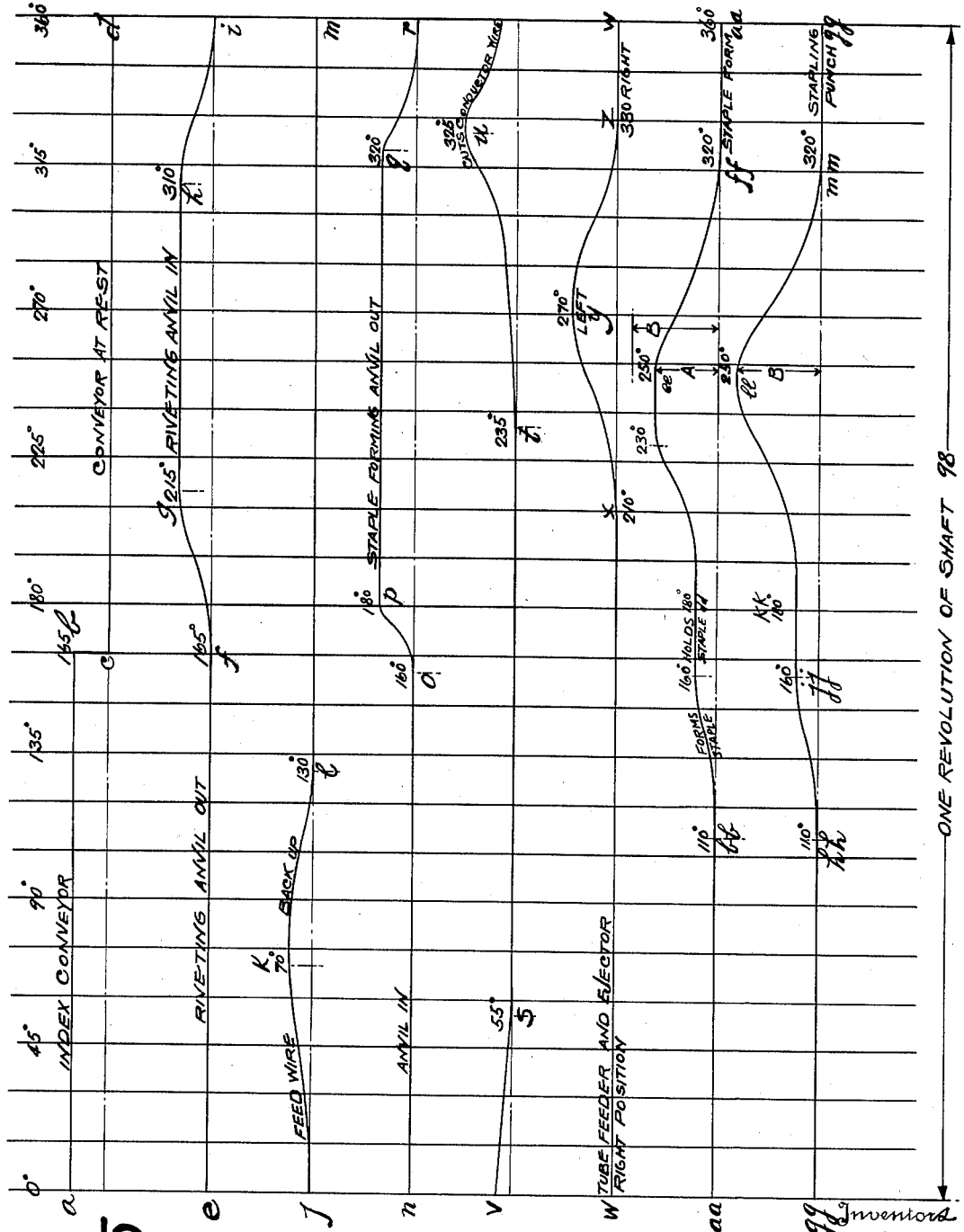
Fig. 25 is a cam chart.

Referring to Figs. 5, 14, 15 and 16, it will be noted that the free end of the wire CC when located against the stop 143 is positioned above an anvil 150 provided by the end of a rod 151 which, as shown in Fig. 10, is slidably supported within a bearing provided by a bracket 156 supported by the table 45. A recess 152 in table 45 is covered by the base of bracket 156 and receives a spring 154 for urging the rod 151 toward the right in Fig. 10, or toward the observer in Figs. 5 and 14, movement toward the right being limited by the shoulder 155 striking a stop provided by the bracket 156. The rod 151 is moved toward the left in Fig. 10 or away from the observer in Figs. 5 and 14 in order to retract the anvil 150 while applying the staples to the work. The mechanism for moving the rod 151 toward the left comprises an arm 157 passing through a slot 158 in the bracket 156 and received by a slot 159 in the rod 151. The arm 157 is pivotally supported upon a stub shaft 160 carried by a bracket 161 attached to the table 45. The hub of the arm 157 is integral with an arm 162 carrying a roller 163 which cooperates with the cam 103, as shown in Figs. 11 and 25.

The portion of wire CC located above the anvil 150 when in the advanced position shown in Fig. 14 is cut off at CCX by the cooperation of the cutting edge 164 provided by the bottom surface of the vertically movable slide 165 which is guided between the bracket 156 and a bracket 168 secured to the table 45, as shown in Fig. 13. The shearing edge 164 cooperates with a shearing block 169 secured to bracket 156 by screw 167 to shear the wire at CCX in Fig. 14. The stop 143 already referred to is carried by the slide 165. The slide 165 carries a stud 170 which is rotatable and may be secured in a desired position of angular adjustment by a wedging pin 171 which may be driven through a hole 172 in the slide 165 and which is received by an annular groove 173 in the pin 170. The pin 170 carries an eccentric extension 174 providing a journal for a roller 175 which cooperates with the cam race 105 in the disc 104. By loosening the wedge pin 171 and turning the rod 170, the slide 165 can be raised or lowered with respect to the axis of the roller 175. In this way the lower end of the slide 165 can be adjusted relative to the wire CC and anvil 150.

Referring to Figs. 14, 15 and 16, it will be noted that the lower end of the slide 165 is notched at 176 to receive the anvil 150 when the slide 165 moves from the position shown in Fig. 14 to that shown in Fig. 15. The wire will not only be cut at CCX but also will be bent around the anvil 150 to provide the staple C. As the slide 165 moves downwardly into the position shown in Fig. 15 a riveting punch 180 moves vertically downwardly upon the rivet C, as shown in Fig. 15. The punch 180 is guided in a vertical groove (see Fig. 13) in the slide 165 and is provided with an arm 181 carrying an angular adjustable pin 182 secured in position by a wedging pin 183 and having an eccentric extension 184 carrying a roller 185 which cooperates with the cam race 106 of the disc 104. When the wedging pin 183 is loosened, the pin 182 can be turned in order to adjust the height of the punch 180 relative to the axis of the roller 185. In this way the lower end of the punch 180 can be adjusted relative to the staple wire CC and the anvil 150. The bifurcations of the lower end of the slide 165 are grooved at 165a and 165b in Figs. 14, 15 and 16 to provide clearance for the branches of the staple C.

Staple applying mechanism

Following the movement of a tube A into station M of Figs. 5 and 10 a riveting anvil 190 is moved from the position shown in Fig. 14 to that shown in Fig. 15 wherein two notches 191 provided by the anvil are located vertically below the points of the staple C. The conductor wire B which has been guided into the position shown in Fig. 15 vertically above the notches 191 is in position for being connected with the tube A by the staple C. Following the withdrawal of the staple forming anvil 150, the staple forming member 165 and the staple riveting punch 180 move downwardly under the actions of cams 105 and 106 respectively. After the staple forming member 165 has moved into the position shown in Fig. 16 so as to locate the staple C slightly above the tube A, the staple forming member 165 remains stationary while the staple riveting punch 180 continues its downward movement in order to force the points of the staple C into the tube A and to clinch them under the inside wall of the tube by virtue of the action of the points of the staple upon the surfaces of the anvil 190 defining the notches 191. In this way the wire B is fastened by the staple C to the tube A.

During the wire attaching operation a notch D shown in Fig. 2 is cut in the end of the tube. This is accomplished by virtue of the engagement of the stop block 143 carried by the slide 165 with a notch cutting lever 200 which cooperates with a cutting surface 201 provided by the anvil 190 as the stop block 143 moves from the position shown in Fig. 15 to that shown in Fig. 16. The notch in the tube A is indicated also at D in Fig. 16. The cutting lever 200 is pivoted upon a pin 202 which extends across a recess 203 provided in a rod 204 which carries the anvil 190. The cutting lever 200 is held normally in the position shown in Figs. 14 and 15 by a spring 205 received by a socket 206 in the rod 204.

The bracket 168 carries a guide bearing 210 for supporting the rod 204 for horizontal sliding movement. The rod 204 carries a pin 212 which passes through the branches 213 of an U-shaped block 214 which straddles the rod 204 and is received by notches in the bifurcated end 215 of a lever 216 which also straddles the rod 204. The arm 216 is pivotally supported by rod 217 carried by brackets 218 and 219 fastened to the table 45. The lever 216 is integral with an arm 220 carrying a pin 221 pivotally supporting a roller 222 which is received by the race 223 of cam 108. The cam 108 operates to withdraw the anvil 190 from the conveyor 80 so that the conveyor can be turned into its next position. Following the turning of the conveyor the cam 108 operates to move the anvil 190 into a tube A and to maintain it there during the next stapling operation.

Mechanism for cutting the conductor wire

The conductor wire B which has been stapled to a tube A while the station M is not severed until after that tube has moved forward through position A1 in Fig. 10 to position A2 then the wire is cut at BX by shearing surface 230 and shear block 231 provided respectively by the plate 83 and a plunger 232 which is guided by bushing 233 carried by a bracket 234 attached to the under side of the table 45. The plunger 233 carries a locating pilot 235 received by each one of a series of recesses 236 provided by the plate 83. Each recess 236, after it is brought opposite the pilot 235 receives the pilot to locate the conveyor 80 in proper position so that the shearing block 231 of the plunger 232 will cooperate with a shearing surface 230 of the plate 83 when the plunger 232 is moved downwardly.

The plunger 232 is actuated by the cam 107 whose race receives a roller 240 carried by lever 241 pivoted upon a rod 242 carried by brackets 243 and 244 attached to the table 45. The lever 241 is bifurcated to provide parts 246 and 247 as shown in Fig. 4, these parts straddle an arm 248 also pivoted upon the rod 242. As shown in Fig. 7 a bolt 250 passes through the bifurcations 246 and 247 and through the intermediate arm 248. The portion 251 of this bolt 250 which is received by a round hole in the arm 248 is eccentric with respect to the portions of the bolts which are received by the bifurcations 246 and 247. The portion 252 received by bifurcation 247 is cylindrical and has a threaded end receiving a nut 253. The portion 254 received by the bifurcation 246 is larger in diameter than other portions and is frusto-conical in form and is received by a conical recess 255 provided by the bifurcation 246. The head 254 has a square extension 256 by which the bolt may be turned after loosening the nut 253 in order to vary the relation between the arm 248 and the lever 241. In this way an adjustment can be effected for the purpose of adjusting the location of the plunger 232 relative to the plate 83. Referring particularly to Fig. 10 it will be noted that the arm 248 has bifurcations 260 and 261. The part 260 straddles the plunger 232 and presses against the under side of its head 232a. The bifurcation 261 rests upon the head 232a and is located between lugs 232b provided by the head. Screw 265 passes through bracket 234 to secure the sleeve 233 and has its inner end in a groove 266 in the plunger 232 to prevent the latter from turning. The pilot 235 is notched at 267 to provide clearance for conductor wire B.

While the conveyor 80 remains stationary the cam 107 operates the mechanism described to cut the wire B at the point BX. Therefore, when a tube A arrives at station N in Fig. 10, its wire B has been severed from the remainder of the wire; and the tube is then ready to be removed from the conveyor.

*Conductor wire guide means*

The conductor wire B is carried by reel BR mounted on a suitable spindle 270. The wire B passes through a hardened guide block 271 fastened to a block 272 which is fastened to the bracket 273 which is attached together with the bracket 274 to the table 45. The block 272 carries rods 275 each pivotally supporting a lever 276. The levers 276 are urged together and against the wire B by a flexible band 277. The wire B passes around a grooved pulley 278 mounted on a shaft 279 carried by a bracket 274. The pulley 278 is so located that its groove will be in a vertical plane at right angles to the axis of the conveyor 80 and passing the middle point of the staple C as viewed in Fig. 15. In this way the wire B will be guided so that it will be located upon the tubes A and will be midway between the grooves 191 of the riveting anvil 190.

If wire B has not previously been attached to a tube A which is still in the conveyor 80 at the time the machine starts, the wire B must be manually pulled from the reel BR and be threaded into the machine and located manually so that it will become attached to a tube by subsequent riveting operations. After the wire B has itself been attached to a tube in the conveyor 80, then the wire B will be automatically pulled from the reel BR by rotation of the conveyor 80.

Slack in the wire B between the pulley 278 and the tube A to which the wire is attached will be taken up due to the friction exerted upon the wire B by the levers 276.

*Tube feeding ejecting machine*

The tubes A are contained in hoppers 300 located above the machine and supported by frame members 301 and 302 shown in Figs. 1 and 3. The hoppers 300 are provided with chutes 304 from which the operator takes the tubes A and inserts them in a chute 305 down which the tubes A descend by gravity and until the lowermost one rests upon a plate 306 which locates the lowermost tube A in alignment with a tube receiving recess 82 of the conveyor 80. The tube A is moved from the position shown in Fig. 10 into the position shown in Fig. 17 or from the position shown in Fig. 9 to that shown in Fig. 18 by a horizontally slidable block 307 which rests upon the plate 306. Screws 308 and 309 are attached to block 307, bars 310 and 311 respectively, which are located in the planes of bars 88 and 85 respectively. The bars 310 and 311 prevent the tube A from shifting endwise while being moved into the conveyor 80.

Figure 17:
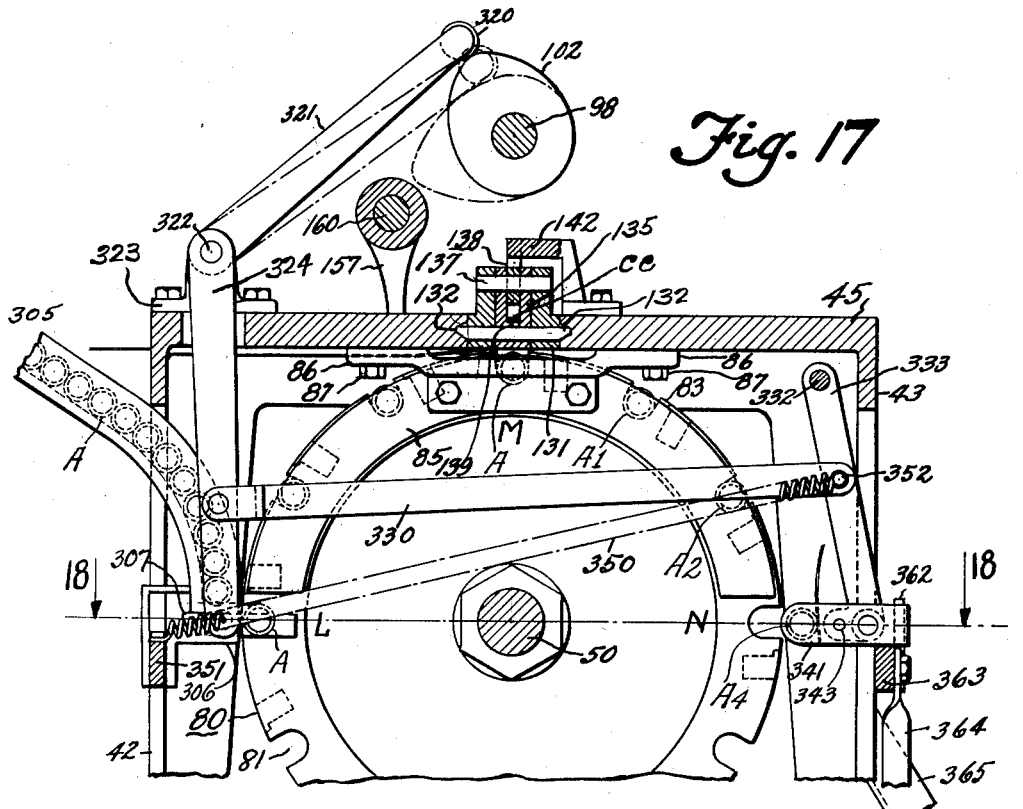
Fig. 17 is a sectional view taken on the line 17—17 of Fig. 5.

The sliding block 307 is actuated by cam 102 which cooperates with a roller 320 carried by an arm 321 attached to a shaft 322 carried by a bracket 323, see Fig. 17. The shaft 322 is attached to an arm 324 which is attached by screw 309 to the block 307. The cam 102 is so timed that it will affect the right hand and then the left hand movement of the block 307 while the conveyor 80 is at rest. The tube feeding mechanism is connected also with a tube ejecting mechanism. The lever 324 is connected by a link 330 with a lever 331 pivoted on a rod 332. The rod 332 carries a companion lever 333. The levers 331 and 333 are welded at their lower ends to a tube 335 providing guides for horizontally slidable pins 336 and 337 urged toward each other by a tension spring 338. The pins 336 and 337 are attached respectively to bars 340 and 341 carrying pins 342 and 343 which enter holes provided by the lower ends of levers 333 and 331 respectively. The bars 340 and 341 are not permitted to turn although they are capable of moving laterally with respect to the tube 335. The bars 340 and 341 which are provided with latch members 344 and 345 respectively have beveled camming surfaces 346 and 347 respectively. A spring 350 is connected to its left end to a cross bar 351 and at its right end with a pin 352 which connects the link 320 with the lever 331. The spring 350 operates to urge the levers 331 and 334 toward the left and hence causes the roller 320 to bear against the cam 102.

While the levers 324 and 321 are located in their right hand positions as shown in Fig. 17 the conveyor is rotated into the next position. While the conveyor is at rest the cam 102 operates so that the levers 324 and 331 swing toward the left and then turn to the right to normal position. During the left swing of the lever 324 the block 307 moves toward the left away from the lowermost tube A in the chute 305 permitting the same to drop upon the plate 306. During the left hand swing of the lever 331 the bevel surfaces 346 and 347 of the latches 344 and 345 of the bars 340 and 341 respectively engage the ends of a tube A located at the station N. As the bars 340 and 341 move toward the left from the position in Fig. 18 to that shown in Fig. 19, they are cammed outwardly away from the tube A until the latches 344 and 345 clear the ends of the tube A whereupon latches will slip into the ends of the tube as shown in Fig. 19.

Figure 18:
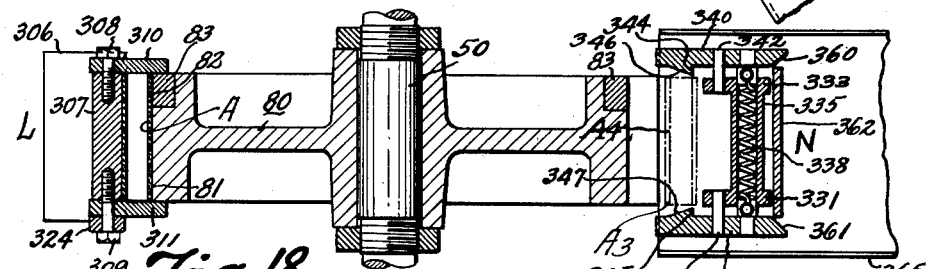
Fig. 18 is a sectional view taken on the line 18—18 of Fig. 17.
Figure 19:
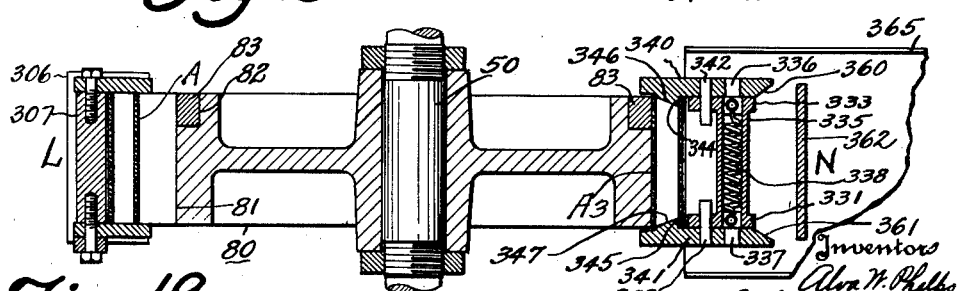
Fig. 19 is a view similar to the view 18 showing the mechanism in a different position.

During the swing of the levers 324 and 331 toward the right to normal position a tube A will be fed into the conveyor 80 at station L and the tube at station N will be ejected by movement from position A3 shown in Figs. 10 and 19 to the position A4 shown in Figs. 17 and 18. As the lever 331 swings toward the right into final position the bars 340 and 341 are caused to separate again due to the fact that beveled surfaces 360 and 361 provided thereby engage the edges of a plate 362 attached to a cross bar 363 attached to the supporting table 45. The cross bar 363 carries brackets 364 which support chute 365 into which the complete work is dropped within the bars 340 and 341 which are separated as shown in Fig. 18. The chute 365 guides the work into a suitable container, not shown.

*Résumé of mode of operation*

When using the machine for the first time the conveyor 80 is manually loaded with the tubes A from the station L to the station M. The conveyor 80 can be manually rotated by turning the hand wheel attached to shaft 98. After the conveyor has been filled with tubes as far as station M, the operator will thread the staple forming wire CC through bore 130 of the wire guide block 131 and pass this wire toward the right as viewed in Fig. 5 until it reaches the stop block 143. The operator will pass the wire B through guide 271, between the levers 276, around the pulley 278 then beneath the table 45 as shown in Fig. 10 until this wire rests upon the tube A at station M and projects slightly beyond this tube. The machine is now ready to be rotated by power. The machine is connected with the power shaft 77 by shifting the clutch member 71 toward the left as viewed in Figs. 4 and 5. This is accomplished by moving the lever 400 counterclockwise as viewed in Fig. 4. The lever 400 is pivoted at 401 and has bifurcations 402 which carry a screw pin 403 received by a groove 404 in the clutch member 71. When the clutch member 71 is engaged with the clutch member 73 the power shaft 77 will be connected with the shaft 62 and the cycle of operation of the machine will commence. Sprocket gears 95 and 97 are of the same size; therefore, shaft 98 will rotate at the same speed as shaft 62.

The cycle of operation of the machine will now be described with reference to the chart shown in Fig. 25, which shows operations performed by the machine during one revolution of the cam shaft 98. The diagram $a$—$b$—$c$—$d$ represents the operation of the conveyor. The line $a$—$b$ extending from zero to 165° indicates that the conveyor turns during the first 165° of rotation of shaft 98. The line $c$—$d$ indicates that the conveyor is at rest during the remainder of the rotation of shaft 98.

Diagram $e$—$f$—$g$—$h$—$i$ represents the movement of the riveting anvil 190. Line $e$—$f$ shows that the riveting anvil is retracted from zero to 165°. Line $f$—$g$ represents movement of the anvil 190 from the out position shown in Fig. 14 to the in position shown in Fig. 15, during rotation of shaft 98 from the 165° to the 215° position. The line $g$—$h$ shows that the anvil remains in the position shown in Figs. 15 and 16 between 215° and 310°. Line $h$—$i$ shows that between 310° and 360° the riveting anvil is retracted.

Diagram $j$—$k$—$l$—$m$ represents the motion of the feed wire slide 131. Line $j$—$k$ represents motion of the feed slide 131 toward the right in Fig. 5 from zero to 70°. Line $k$—$l$ represents the back-up of the feed slide 131 from 70° to 130°. Line $l$—$m$ represents no motion between 130° and 360°.

Diagram $n$—$o$—$p$—$q$—$r$ represents operation of the staple forming anvil 150. Line $n$—$o$ designates between zero and 160° that the stapling anvil is vertically below the stapling member 165. Line $o$—$p$ represents that between 160° and 180° the staple forming anvil is withdrawn. Line $p$—$q$ designates that between 180° and 320° the staple forming anvil remains withdrawn. Line $q$—$r$ designates that between 320° and 360° a staple forming anvil is moved in under the staple forming member 165. It will be noted that the staple forming anvil is out while the riveting anvil is in.

Diagram $s$—$t$—$u$—$v$ represents the operation of mechanism for cutting the conductor wire. Line $s$—$t$ represents that between 165° and 235° the conductor wire cutter is retracted from the conveyor. Line $t$—$u$ represents that between 322° and 325° the plunger 332 moves inwardly to pilot the conveyor into the correct position for receiving the cutter 231, and to cause the cutter 231 to engage the cutter 230 to cut the wire at BX shown in Fig. 10. The line $u$—$v$—$x$ represents that between 325° and 360°, and 0° and 55° the plunger 232 is retracted.

Diagram $w$—$x$—$y$—$z$ represents the operation of the tube feed and tube ejector. The line $z$—$w$—$w$—$x$ represents that between 330° and 360°, and 0° and 210° the levers 324 and 331 are located toward the right as viewed in Fig. 17. Hence the feed block 307 will be advanced toward the conveyor and the ejector retracted. Line $x$—$y$ indicates that between 210° and 270° the motion of the levers 224 and 231 toward the left takes place in order to permit the lowering of the tubes A in the chute 305 and to cause the ejector to grip a tube at station N. Line $y$—$z$ represents that between 270° and 330° levers 324 and 331 move toward the right to feed a tube into the conveyor and to remove a tube from the conveyor.

Diagram $aa$—$bb$—$cc$—$dd$—$ee$—$ff$—$aa$ represents the movement of the staple forming plunger 165. Line $ff$—$aa$—$bb$ represents that between 320° and 360° and 0° and 110° the staple forming plunger 165 remains up. Line $bb$—$cc$ represents that between 110° and 160° the staple forming plunger 165 moves downwardly from the position shown in Fig. 14 to that shown in Fig. 15 to form a staple around the staple forming anvil 150, which is under the plunger 165 at least until 160°. Line $cc$—$dd$ represents an idle period between 160° and 180° during which time the staple C is held by the plunger 165 while the anvil at 180 is withdrawn. In order that the staple C will not move laterally while withdrawing the anvil 150 the plunger 165 is provided with the grooves 165$a$ and 165$b$ which receives the legs or points of the staple during the time the staple is being formed around the anvil 150. Line $dd$—$ee$ represents that between 180° and 250° the plunger 165 moves from the position in Fig. 15 to the position shown in Fig. 16 in order to lower the staple C so that its legs or points will be located directly above the riveting anvil 190. Line $ee$—$ff$ represents that between 253° and 220° the staple forming plunger 165 is elevated.

Diagram $gg$—$hh$—$jj$—$kk$—$ll$—$mm$—$gg$ represents the operation of the staple driving punch or plunger 180. It will be noted that the staple riveting punch 180 follows the movent of the staple forming plunger 165 with the exception that between 180° and 250° represented by the line $kk$—$ll$ the staple forming punch 180 moves downwardly further than the staple forming plunger 165. By the time that the shaft 98 has turned 230° the plunger 165 will have moved into the position shown in Fig. 16. During 230° and 250° the plunger 165 remains down while the punch 180 moves down further to apply the staple C to the work as shown in Fig. 16.

While the form of embodiment of the present invention as herein disclosed constitutes a preferred form, it is to be understood that other forms might be adopted, all coming within the scope of the claims which follow.

What is claimed is as follows:

1. Apparatus for fastening a conductor wire to a tube comprising, in combination, an anvil received within the tube, means for supplying staples, means for forcing a staple into the tube and against the anvil to secure a wire to the tube, and means for notching the tube adjacent the staple fastened to the tube.

2. Apparatus for fastening a conductor wire to a tube comprising, in combination, an anvil received within the tube, means for locating a conductor wire upon the tube, means for supplying staples, means for forcing a staple into the tube and against the anvil to secure the wire to the tube, and means for notching the tube adjacent the staple fastened to the tube.

3. Apparatus for fastening a conductor wire to a tube comprising, in combination, an anvil received within the tube, means for supplying staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

4. Apparatus for fastening a conductor wire to a tube comprising, in combination, an anvil received within the tube, means for forming wire staples, means for forcing a staple into the tube and against the anvil to secure a wire to the tube, and means for notching the tube adjacent the staple fastened to the tube.

5. Apparatus for fastening a conductor wire to a tube comprising, in combination, an anvil received within the tube, means for locating a conductor wire upon the tube, means for forming wire staples, means for forcing a staple into the tube and against the anvil to secure the wire to the tube, and means for notching the tube adjacent the staple fastened to the tube.

6. Apparatus for fastening a conductor wire to a tube comprising, in combination, an anvil received within the tube, means for forming wire staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

7. Apparatus for fastening a conductor wire to a tube comprising, in combination, an anvil received within the tube, means for feeding stapling wire, means for cutting off a length of stapling wire and forming it into a staple, means for forcing a staple into the tube and against the anvil to secure a wire to the tube, and means for notching the tube adjacent the staple fastened to the tube.

8. Apparatus for fastening a conductor wire to a tube comprising, in combination, an anvil received within the tube, means for locating a conductor wire upon the tube, means for feeding stapling wire, means for cutting off a length of stapling wire and forming it into a staple, means for forcing a staple into the tube and against the anvil to secure the conductor wire to the tube, and means for notching the tube adjacent the staple fastened to the tube.

9. Apparatus for fastening a conductor wire to a tube comprising, in combination, an anvil received within the tube, means for feeding stapling wire, means for cutting off a length of stapling wire and forming it into a staple, means for guiding conductor wire to the tube from a wire supply, means for forcing a staple into the tube and against the anvil to secure the conductor wire to the tube, means for notching the tube adjacent the staple fastened to the tube, and means for severing a length of wire attached to the tube from the supply.

10. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for supplying staples; and means for forcing a staple into the tube and against the anvil to secure a wire to the tube.

11. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for supplying staples; means for locating a conductor wire upon the tube; and means for forcing a staple into the tube and against the anvil to secure the wire to the tube.

12. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for supplying staples; means for locating a conductor wire upon the tube; means for forcing a staple into the tube and against the anvil to secure the wire upon the tube; and means for severing a length of wire attached to the tube from the supply.

13. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for supplying staples; means for forcing a staple into the tube and against the anvil to secure a wire to the tube; and means for notching the tube adjacent the staple fastened to the tube.

14. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for locating a conductor wire upon the tube, means for supplying staples, means for forcing a staple into the tube and against the anvil to secure the wire to the tube, and means for notching the tube adjacent the staple fastened to the tube.

15. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for supplying staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

16. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for forming wire staples, and means for forcing a staple into the tube and against the anvil to secure a wire to the tube.

17. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for locating a conductor wire upon the tube, means for forming wire staples, and means for forcing a staple into the tube and against the anvil to secure the wire to the tube.

18. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for forming wire staples, means for guiding conductor wire to the tube from a wire supply, means for forcing a staple into the tube and against the anvil to secure the wire to the tube, and means for severing a length of wire attached to the tube from the supply.

19. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for forming wire staples, means for forcing a staple into the tube and against the anvil to secure a wire to the tube, and means for notching the tube adjacent the staple fastened to the tube.

20. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for locating a conductor wire upon the tube, means for forming wire staples, means for forcing a staple into the tube and against the anvil to secure the wire to the tube, and means for notching the tube adjacent the staple fastened to the tube.

21. Apparatus for fastening a conductor wire to a tube comprising, in combination, means providing a notch for externally supporting a tube, said notch permitting the introduction of a tube in a direction transverse to the tube axis; a reciprocable anvil movable into and out of a supported tube; means for reciprocating the anvil; means for forming wire staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

22. Apparatus for fastening a conductor wire to a tube comprising, in combination, a conveyor having a plurality of tube holders, an anvil insertable into a tube when it arrives at a certain station, means for supplying staples, and means for forcing a staple into the tube and against the anvil to secure a wire to the tube.

23. Apparatus for fastening a conductor wire to a tube comprising, in combination, a conveyor having a plurality of tube holders, an anvil insertable into a tube when it arrives at a certain station, means for locating a conductor wire upon the tube, means for supplying staples, and means for forcing a staple into the tube and against the anvil to secure the wire to the tube.

24. Apparatus for fastening a conductor wire to a tube comprising, in combination, a conveyor having a plurality of tube holders, an anvil insertable into a tube when it arrives at a certain station, means for supplying staples, means for guiding conductor wire to the tube from a wire supply, means for forcing a staple into the tube and against the anvil to secure the wire to the tube, and means for severing a length of wire attached to the tube from the supply.

25. Apparatus for fastening a conductor wire to a tube comprising, in combination, a conveyor having a plurality of tube holders, an anvil insertable into a tube when it arrives at a certain station, means for supplying staples, means for forcing a staple into the tube and against the anvil to secure a wire to the tube, and means for notching the tube adjacent the staple fastened to the tube.

26. Apparatus for fastening a conductor wire to a tube comprising, in combination, a conveyor having a plurality of tube holders, an anvil insertable into a tube when it arrives at a certain station, means for locating a conductor wire upon the tube, means for supply staples, means for forcing a staple into the tube and against the anvil to secure the wire to the tube, and means for notching the tube adjacent the staple fastened to the tube.

27. Apparatus for fastening a conductor wire to a tube comprising, in combination, a conveyor having a plurality of tube holders, an anvil insertable into a tube when it arrives at a certain station, means for supplying staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

28. Apparatus for fastening a conductor wire to a tube comprising, in combination, a conveyor having a plurality of tube holders, an anvil insertable into a tube when it arrives at a certain station, means for forming wire staples, and means for forcing a staple into the tube and against the anvil to secure a wire to the tube.

29. Apparatus for fastening a conductor wire to a tube comprising, in combination, a conveyor having a plurality of tube holders, an anvil insertible into a tube when it arrives at a certain station, means for locating a conductor wire upon the tube, means for forming wire staples, and means for forcing a staple into the tube and against the anvil to secure the wire to the tube.

30. Apparatus for fastening a conductor wire to a tube comprising, in combination, a conveyor having a plurality of tube holders, an anvil insertable into a tube when it arrives at a certain station, means for forming wire staples, means for guiding conductor wire to the tube from a wire supply, means for forcing a staple into the tube and against the anvil to secure the wire to the tube, and means for severing a length of wire attached to the tube from the supply.

31. Apparatus for fastening a conductor wire to a tube comprising, in combination, a conveyor having a plurality of tube holders, an anvil insertable into a tube when it arrives at a certain station, means for forming wire staples, means for forcing a staple into the tube and against the anvil to secure a wire to the tube, and means for notching the tube adjacent the staple fastened to the tube.

32. Apparatus for fastening a conductor wire to a tube comprising, in combination, a conveyor having a plurality of tube holders, an anvil insertable into a tube when it arrives at a certain station, means for locating a conductor wire upon the tube, means for forming wire staples, means for forcing a staple into the tube and against the anvil to secure the wire to the tube, and means for notching the tube adjacent the staple fastened to the tube.

33. Apparatus for fastening a conductor wire to a tube comprising, in combination, a conveyor having a plurality of tube holders, an anvil insertable into a tube when it arrives at a certain station, means for forming wire staples, means for guiding conductor wire to the tube from a wire supply, means for forcing a staple into the tube and against the anvil to secure the wire to the tube, means for notching the tube adjacent the staple fastened to the tube, and means for severing a length of wire attached to the tube from the supply.

34. Apparatus for fastening a conductor wire to a tube comprising, in combination, a conveyor having a plurality of tube holders, an anvil insertable into a tube when it arrives at a certain station, means for feeding stapling wire, means for cutting off a length of stapling wire and forming it into a staple, and means for forcing a staple into the tube and against the anvil to secure a wire to the tube.

35. Apparatus for fastening a conductor wire to a tube comprising, in combination, a conveyor having a plurality of tube holders, an anvil insertable into a tube when it arrives at a certain station, means for locating a conductor wire upon the tube, means for feeding stapling wire, means for cutting off a length of stapling wire and forming it into a staple, and means for forcing a staple into the tube and against the anvil to secure the conductor wire to the tube.

36. Apparatus for fastening a conductor wire to a tube comprising, in combination, a conveyor having a plurality of tube holders, an anvil insertable into a tube when it arrives at a certain station, means for feeding stapling wire, means for cutting off a length of stapling wire and forming it into a staple, means for guiding conductor wire to the tube from a wire supply, means for forcing a staple into the tube and against the anvil to secure the conductor wire to the tube, and means for severing a length of wire attached to the tube from the supply.

37. Apparatus for fastening a conductor wire to a tube comprising, in combination, a conveyor having a plurality of tube holders, an anvil insertable into a tube when it arrives at a certain station, means for feeding stapling wire, means for cutting off a length of stapling wire and forming it into a staple, means for forcing a staple into the tube and against the anvil to secure a wire to the tube, and means for notching the tube adjacent the staple fastened to the tube.

38. Apparatus for fastening a conductor wire to a tube comprising, in combination, a conveyor having a plurality of tube holders, an anvil insertable into a tube when it arrives at a certain station, means for locating a conductor wire upon the tubes, means for feeding stapling wire, means for cutting off a length of stapling wire and forming it into a staple, means for forcing a staple into the tube and against the anvil to secure the conductor wire to the tube, and means for notching the tube adjacent the staple fastened to the tube.

39. Apparatus for fastening a conductor wire to a tube comprising, in combination, a conveyor having a plurality of tube holders, an anvil insertable into a tube when it arrives at a certain station, means for feeding stapling wire, means for cutting off a length of stapling wire and forming it into a staple, means for guiding conductor wire to the tube from a wire supply, means for forcing a staple into the tube and against the anvil to secure the conductor wire to the tube, means for notching the tube adjacent the staple fastened to the tube, and means for severing a length of wire attached to the tube from the supply.

40. Apparatus for fastening a conductor wire to a tube comprising, in combination, a rotatable conveyor wheel having a notched periphery, each notch providing a tube receiving recess, means for feeding tubes to the conveyor, means guiding conductor wire to the tubes from a wire supply, means for attaching the conductor wire to a tube, means for severing a length of wire attached to a tube from the remainder of the supply, means for removing the tubes from the conveyor, and means for intermittently turning the conveyor.

41. Apparatus for fastening a conductor wire to a tube comprising, in combination, a rotatable conveyor wheel having a notched periphery, each notch providing a tube receiving recess, means for feeding tubes to the conveyor, means for locating a wire upon a tube, means for attaching the conductor wire to a tube, means for removing the tubes from the conveyor, and means for intermittently turning the conveyor.

42. Apparatus for fastening a conductor wire to a tube comprising, in combination, a rotatable conveyor wheel having a notched periphery, each notch providing a tube receiving recess, means for feeding tubes to the conveyor, means for locating a wire upon a tube, means for forming a wire staple and for attaching the staple and conductor wire to a tube, means for removing the tubes from the conveyor, and means for intermittently turning the conveyor.

43. Apparatus for fastening a conductor wire to a tube comprising, in combination, a rotatable conveyor wheel having a notched periphery, each notch providing a tube receiving recess, means for feeding tubes to the conveyor, means for guiding conductor wire to the tubes from a wire supply, means for forming a wire staple and for attaching the staple and conductor wire to a tube, means for severing a length of wire attached to a tube from the remainder of the supply, means for removing the tubes from the conveyor, and means for intermittently turning the conveyor.

44. Apparatus for fastening a conductor wire to a tube comprising, in combination, a rotatable conveyor wheel having a notched periphery, each notch providing a tube receiving recess, means for feeding tubes to the conveyor, means for locating a wire upon a tube, means for feeding staple forming wire, means for forming a wire staple and for attaching the staple and conductor wire to a tube, means for removing the tubes from the conveyor, and means for intermittently turning the conveyor.

45. Apparatus for fastening a conductor wire to a tube comprising, in combination, a rotatable conveyor wheel having a notched periphery, each notch providing a tube receiving recess, means for feeding tubes to the conveyor, means for guiding conductor wire to the tubes from a wire supply, means for feeding staple forming wire, means for forming a wire staple and for attaching the staple and conductor wire to a tube, means for severing a length of wire attached to a tube from the remainder of the supply, means for removing the tubes from the conveyor, and means for intermittently turning the conveyor.

46. Apparatus for fastening a conductor wire to a tube comprising, in combination, a rotatable conveyor having a plurality of tube holders; means located at a station of the conveyor for attaching a conductor wire to a tube; a chute for receiving the tubes from the conveyor, said chute originating at a station of the conveyor; means for transferring the tubes from the conveyor into said chute, said means comprising a pair of latching members yielded toward each other by a spring, a pivotally mounted lever carrying the latching members in such manner that they are movable toward and away from each other, said latching members upon rocking of the lever toward the conveyor latching a tube, and a stationary member engaging and moving the latching members away from each other upon rocking of the lever away from the conveyor whereupon the tube is free to descend into the chute; and means for rocking the lever in either direction.

47. Apparatus for fastening a conductor wire to a tube comprising, in combination, a rotatable conveyor having a plurality of tube holders; a chute for containing a supply of tubes in stacked order, said chute leading to a station of the conveyor; reciprocable means for transferring the lowermost tube from the chute into a tube holder of the conveyor; means for indexing the conveyor; means located at another station of the conveyor for attaching a conductor wire to a tube; a discharge chute for receiving the tubes from the conveyor; means for transferring the tubes from the conveyor into said discharge chute, said means comprising a pair of latching members yielded toward each other by a spring, said latching members being movable together toward the conveyor thereby latching a tube and being movable away from the conveyor with the tube, and a stationary member for moving the latching members away from each other when they engage said stationary stop during movement away from the conveyor whereupon the tube is free to descend into the discharge chute; and a linkage connecting the latching members with the tube transferring means in such manner that reciprocation of the latter causes transfer of a tube from the supply chute to the conveyor and removal of a tube from the conveyor into the discharge chute.

48. Apparatus for fastening a conductor wire to a tube comprising, in combination, a rotatable conveyor having a plurality of tube holders and shearing surfaces and recesses; means for indexing the conveyor; means for guiding conductor wire from a supply to a tube at a certain station of the conveyor; means located at said certain station of the conveyor for attaching the conductor wire to the tube; a reciprocable pilot pin adapted to register with a recess of the conveyor; and a shear member moved into cooperation with a shearing surface of the conveyor in response to movement of the pilot pin into registry with a recess of the conveyor in order to sever a length of wire attached to the tube from the supply.

49. Apparatus for fastening a conductor wire to a tube comprising, in combination; a rotatable conveyor having a plurality of tube holders and shearing surfaces and recesses; means for indexing the conveyor; means for guiding conductor wire from a supply to a tube at a certain station of the conveyor; means located at said certain station of the conveyor for attaching the conductor wire to the tube; a reciprocable pilot pin adapted to register with a recess of the conveyor; and a shear member carried by said pilot pin and adapted to cooperate with a shearing surface of the conveyor for severing a length of wire attached to the tube from the supply.

50. Apparatus for fastening a conductor wire to a tube comprising, in combination, an anvil received within the tube, means for forming wire staples, means for forcing a staple into the tube and against the anvil to secure a wire to the tube, and means actuated in response to operation of the staple forming means for notching the tube adjacent the staple fastened to the tube.

51. Apparatus for fastening a conductor wire to a tube comprising, in combination, an anvil received within the tube, means for forming wire staples, means actuated in timed relation with the operation of the staple forming means for forcing a staple into the tube and against the anvil to secure a wire to the tube, and means actuated in response to operation of the staple forming means for notching the tube adjacent the staple fastened to the tube.

52. Apparatus for fastening a conductor wire to a tube comprising, in combination, an anvil received within the tube, means for forming wire staples, means for guiding conductor wire to the tube from a wire supply, means for forcing a staple into the tube and against the anvil to secure the wire to the tube, means actuated in response to operation of the staple forming means for notching the tube adjacent the staple fastened to the tube, and means actuated in timed relation with the operation of the staple forming means for severing a length of wire attached to the tube from the supply.

53. Apparatus for fastening a conductor wire to a tube comprising, in combination, an anvil received within the tube, means for feeding stapling wire, means for cutting off a length of stapling wire and forming it into a staple, means for forcing a staple into the tube and against the anvil to secure a wire to the tube, and means actuated in response to operation of the cutting and forming means for notching the tube adjacent the staple fastened to the tube.

54. Apparatus for fastening a conductor wire to a tube comprising, in combination, an anvil received within the tube, means for feeding stapling wire, means actuated in timed relation with the operation of the stapling wire feeding means for cutting off a length of stapling wire and forming it into a staple, means actuated in timed relation with the operation of the staple cutting and forming means for forcing a staple into the tube and against the anvil to secure a wire to the tube, and means actuated in response to operation of the staple cutting and forming means for notching the tube adjacent the staple fastened to the tube.

55. Apparatus for fastening a conductor wire to a tube comprising, in combination, a conveyor having a plurality of tube holders, means for indexing the conveyor, an anvil reciprocating into or out of a tube in an intermittent resting position in timed relation with the operation of the indexing means, means for supplying staples, and means for forcing a staple into the tube and against the anvil to secure a wire to the tube.

56. Apparatus for fastening a conductor wire to a tube comprising, in combination, a conveyor having a plurality of tube holders, means for indexing the conveyor, an anvil insertable into a tube when it arrives at a certain station, means for forming wire staples, means for forcing a staple into the tube and against the anvil to secure a wire to the tube, and means actuated in response to operation of the staple forming means for notching the tube adjacent the staple fastened to the tube.

57. Apparatus for fastening a conductor wire to a tube comprising, in combination, a conveyor having a plurality of tube holders, means for indexing the conveyor, an anvil insertable into a tube when it arrives at a certain station, means actuated in timed relation with the operation of the indexing means for forming wire staples, means for forcing a staple into the tube and against the anvil to secure a wire to the tube, and means actuated in response to operation of the staple forming means for notching the tube adjacent the staple fastened to the tube.

58. Apparatus for fastening a conductor wire to a tube comprising, in combination, a conveyor having a plurality of tube holders, means for indexing the conveyor, an anvil reciprocating into or out of a tube in an intermittent resting position in timed relation with the operation of the indexing means, means actuated also in timed relation with the operation of the indexing means for forming wire staples, means for forcing a staple into the tube and against the anvil to secure a wire to the tube, and means actuated in response to operation of the staple forming means for notching the tube adjacent the staple fastened to the tube.

59. Apparatus for fastening a conductor wire to a tube comprising, in combination, a conveyor having a plurality of tube holders, means for indexing the conveyor, an anvil reciprocating into or out of a tube in an intermittent resting position in timed relation with the operation of the indexing means, means also actuated in timed relation with the operation of the indexing means for forming wire staples, means actuated in timed relation with the operation of the staple forming means for forcing a staple into the tube and against the anvil to secure a wire to the tube, and means actuated in response to operation of the staple forming means for notching the tube adjacent the staple fastened to the tube.

60. Apparatus for fastening a conductor wire to a tube comprising, in combination, a rotatable conveyor wheel having a plurality of tube holders, means for feeding tubes to the conveyor, means located at a station of the conveyor for attaching a conductor wire to a tube, means actuated in response to operation of the tube feeding means for removing the tubes from the conveyor, and means for indexing the conveyor.

61. Apparatus for fastening a conductor wire to a tube comprising, in combination, a rotatable conveyor wheel having a plurality of tube holders, means for indexing the conveyor, means actuated in timed relation with the operation of the conveyor indexing means for feeding tubes to the conveyor, means for guiding conductor wire to the tubes from a wire supply, means for attaching the conductor wire to a tube, means for severing a length of wire attached to a tube from the remainder of the supply, and means actuated in response to operation of the tube feeding means for removing the tubes from the conveyor.

62. Apparatus for fastening a conductor wire to a tube comprising, in combination, a rotatable conveyor wheel having a plurality of tube holders, means for indexing the conveyor, means actuated in timed relation with the operation of the conveyor indexing means for feeding tubes to the conveyor, an anvil, means for forming a wire staple; means for forcing the wire staple into a tube and against the anvil to secure a wire to the tube, means actuated in response to operation of the tube feeding means for removing the tubes from the conveyor, and means actuated in response to operation of the staple forming means for notching the tube adjacent the staple fastened to the tube.

63. Apparatus for fastening a conductor wire to a tube comprising, in combination, a movable conveyor having a plurality of tube holders, a mechanism for feeding tubes to the conveyor, means for locating a conductor wire upon a tube when it arrives at a certain station; a mechanism for supplying staples; a mechanism for attaching a staple and the conductor wire to the tube; a mechanism for removing the tubes from the conveyor; a rotatable shaft; cams on said shaft for actuating all mechanisms in a predetermined sequence; and means driven from said shaft for intermittently moving the conveyor.

64. Apparatus for fastening a conductor wire to a tube comprising, in combination, a rotatable conveyor having a plurality of tube holders, a mechanism for feeding tubes to the conveyor; means for guiding conductor wire from a supply to a tube in a certain intermittent resting position in a direction transverse to the axis of rotation of the conveyor; a mechanism for supplying staples; a mechanism for attaching a staple and the conductor wire to the tube, a mechanism for severing the conductor wire between two consecutive tubes to which said wire is attached; a mechanism for removing the tubes from the conveyor; a rotatable shaft; cams on said shaft for actuating all mechanisms in a predetermined sequence, and means driven from said shaft for indexing the conveyor.

65. Apparatus for fastening a conductor wire to a tube comprising, in combination, a rotatable conveyor having a plurality of tube holders, a mechanism for feeding tubes to the conveyor; means for guiding conductor wire from a supply to a tube in a certain intermittent resting position in a direction transverse to the axis of rotation of the conveyor; a mechanism for feeding stapling wire, a mechanism for cutting off a length of stapling wire, for forming said length into a staple and for attaching the staple and the conductor wire to the tube, a mechanism for severing the conductor wire between two consecutive tubes to which said wire is attached; a mechanism for removing the tubes from the conveyor; a rotatable shaft; cams on said shaft for actuating all mechanism in a predetermined sequence, and means driven from said shaft for indexing the conveyor.

66. Apparatus for fastening a conductor wire to a tube comprising, in combination, a rotatable conveyor having a plurality of tube holders, a mechanism for feeding tubes to the conveyor, means for guiding conductor wire from a supply to a tube in a certain intermittent resting position in a direction transverse to the axis of rotation of the conveyor, an anvil, a mechanism for reciprocating the anvil into and out of the tube in said intermittent resting position, a mechanism for feeding staple wire, a mechanism for cutting off a length of stapling wire, for forming said length into a staple and for forcing the staple into the tube and against the anvil to secure the conductor wire to the tube, a mechanism for severing the conductor wire between two consecutive tubes to which said wire is attached; a mechanism for removing the tubes from the conveyor; a rotatable shaft; cams on said shaft for actuating all mechanisms in a predetermined sequence, and means driven from said shaft for indexing the conveyor.

67. Apparatus for fastening a conductor wire to a tube comprising, in combination, a rotatable conveyor having a plurality of tube holders, a mechanism for feeding tubes to the conveyor, means for guiding conductor wire from a supply to a tube in a certain intermittent resting position in a direction transverse to the axis of rotation of the conveyor, an anvil, a mechanism for reciprocating the anvil into and out of the tube in said intermittent resting position, a mechanism for feeding stapling wire, a mechanism for cutting off a length of stapling wire, for forming said length into a staple and for forcing the staple into the tube and against the anvil to secure the conductor wire to the tube, a mechanism for notching the tube adjacent the staple fastened to the tube, a mechanism for severing the conductor wire between two consecutive tubes to which said wire is attached; a mechanism for removing the tubes from the conveyor; a rotatable shaft; cams on said shaft for actuating all mechanisms in a predetermined sequence, and means driven from said shaft for indexing the conveyor.

68. Apparatus for fastening a conductor wire to a tube comprising, in combination, an anvil received within the tube, a shearing member pivoted to the anvil and cooperating with a shoulder of the anvil for cutting a notch into an end portion of the tube, a supply of stapling wire, a mechanism for cutting off a length of stapling wire from the supply, for forming the length into a staple and for forcing the staple into the tube and against the anvil to secure a conductor wire to the tube, and means actuated in response to operation of the last said means for rotating the shear member in a direction in which to notch the end portion of the tube.

69. Apparatus for fastening a conductor wire to a tube comprising, in combination, an anvil received within the tube, a shearing member pivoted to the anvil and cooperating with a shoulder of the anvil for cutting a notch into an end portion of the tube, a supply of stapling wire, reciprocating means for cutting off a length of stapling wire from the supply, for forming the length into a staple and for forcing the staple into the tube and against the anvil to secure a conductor wire to the tube, and means carried by the last said means for rotating the shear member in a direction in which to notch the end portion of the tube.

70. Apparatus for fastening a conductor wire to a tube comprising, in combination, a rotatable conveyor wheel having a notched periphery, each notch providing a tube receiving recess, means for feeding tubes to the conveyor, means for attaching a conductor wire to a tube when it arrives at a certain station. a chute for receiving the tubes from the conveyor, and means for transferring the tubes from the conveyor into the chute, said means comprising a pair of latching members yielded toward each other by a spring, said latching members being moved toward the conveyor thereby latching a tube and then away from the conveyor with the tube in response to operation of the tube feeding means, and a stationary member for moving the latching members away from each other when they engage said stationary stop during movement away from the conveyor whereupon the tube is free to descend into the chute.

ALVA W. PHELPS.
JOHN Q. HOLMES.
CHARLES E. BIRCH.
HOMER E. SMITH.